US007017304B2

(12) United States Patent
Bourque et al.

(10) Patent No.: US 7,017,304 B2
(45) Date of Patent: Mar. 28, 2006

(54) PANEL ASSEMBLY FOR A MOTOR VEHICLE

(75) Inventors: Jeffrey Gerard Bourque, Novi, MI (US); Paul Joseph Kolokowski, Southgate, MI (US); Michael James Lesle, Toledo, OH (US); Lawrence R. Lyke, Novi, MI (US); Thomas William Peyton, Jr., Allen Park, MI (US); Scott Saxon, Northville, MI (US); Marcus Tanksley, Farmington Hills, MI (US); Rick Mark Weinert, Novi, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 123 days.

(21) Appl. No.: 10/689,393

(22) Filed: Oct. 20, 2003

(65) Prior Publication Data

US 2004/0098917 A1 May 27, 2004

Related U.S. Application Data

(60) Provisional application No. 60/429,806, filed on Nov. 27, 2002.

(51) Int. Cl.
*E05F 1/00* (2006.01)

(52) U.S. Cl. .......................... 49/451; 49/450; 292/219; 292/204

(58) Field of Classification Search .................. 49/449, 49/450, 451; 292/207, 219, 204, 227, 52, 292/53, DIG. 20, DIG. 35, DIG. 46, DIG. 73
See application file for complete search history.

(56) References Cited

U.S. PATENT DOCUMENTS 191,403 A * 5/1877 Chamberlin ................ 292/228
766,253 A 8/1904 Howe
1,275,531 A 8/1918 Clews
1,384,904 A 7/1921 Lattimore
1,955,124 A * 4/1934 Hamm ........................ 49/209
2,629,466 A 2/1953 Nardulli
3,085,300 A * 4/1963 Carlston ...................... 49/450
3,264,032 A 8/1966 Smith
3,698,883 A 10/1972 Di Fazio
3,768,847 A * 10/1973 Buck et al. ................. 292/179
3,881,758 A * 5/1975 Gross .......................... 292/87
4,015,367 A * 4/1977 DeBruyn ..................... 49/451
4,073,517 A * 2/1978 Bills ........................... 292/60
4,102,545 A 7/1978 Jay
4,119,341 A 10/1978 Cook
4,227,725 A 10/1980 Lindquist et al.
4,274,666 A 6/1981 Peck
4,304,429 A 12/1981 Gist
4,314,719 A 2/1982 Hawkins
4,571,888 A 2/1986 Jensen
4,911,348 A 3/1990 Rasor et al.
5,203,596 A * 4/1993 Stevens ...................... 292/204
6,260,905 B1 7/2001 Wagner

* cited by examiner

*Primary Examiner*—Jerry Redman
(74) *Attorney, Agent, or Firm*—MacMillan, Sobanski & Todd, LLC

(57) ABSTRACT

A panel assembly for a motor vehicle provides the ability to securely control the size of an opening defined by the panel assembly. The panel assembly thus provides a theft deterrent by making it more difficult to get through a partially open window. The panel assembly comprises a fixed panel defining an opening, and a moveable panel for selectively covering the opening. A handle is attached to the moveable panel and includes a cam that is moveably mounted to the handle and extends through a slot defined in the handle. The cam is biased against the rail and is operable between a locked position and an unlocked position.

16 Claims, 5 Drawing Sheets

10 12 14 23 18 16 20 21 22 30 3

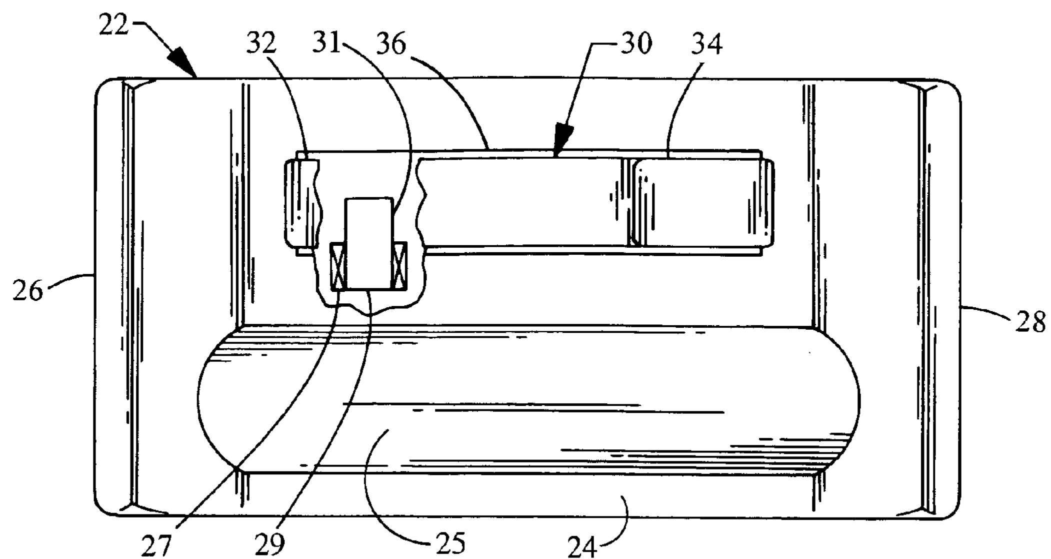
Fig. 3
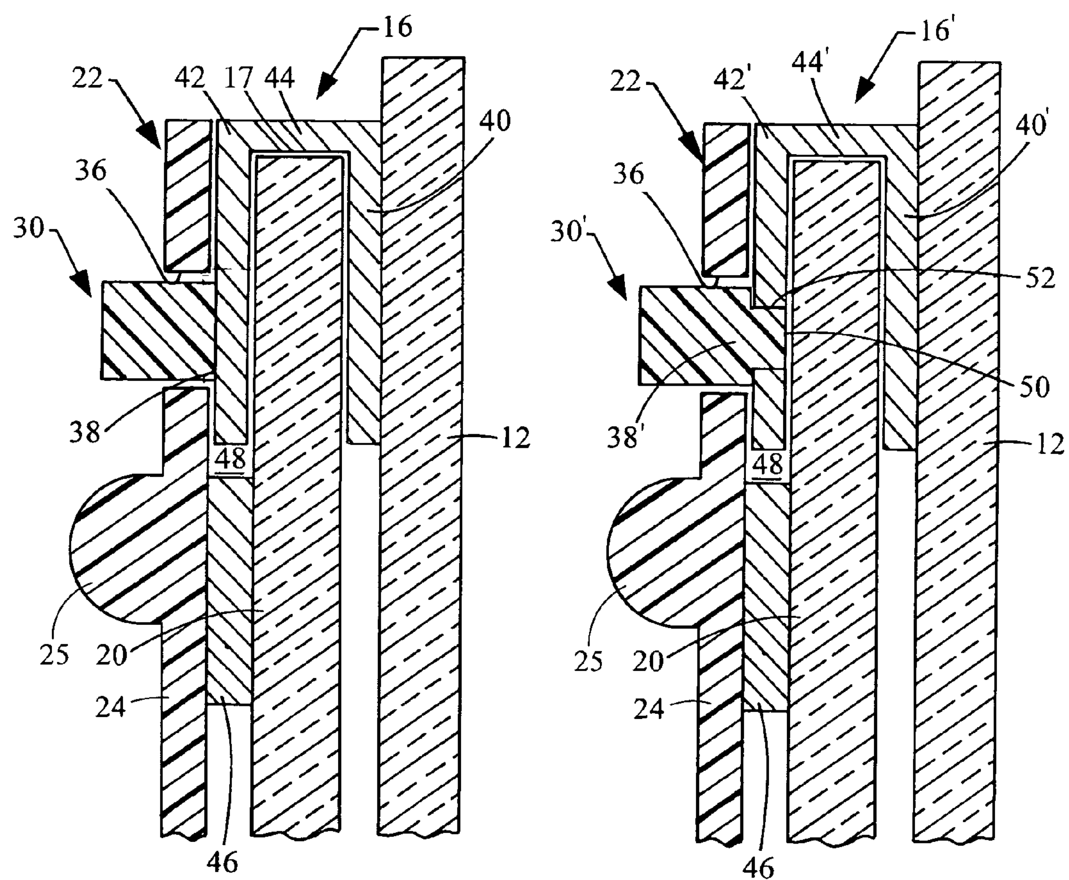

PANEL ASSEMBLY FOR A MOTOR VEHICLE

CROSS-REFERENCE TO RELATED APPLICATIONS

This patent application claims the benefit of U.S. provisional patent application 60/429,806, filed Nov. 27, 2002.

FIELD OF THE INVENTION

The present invention relates generally to a slideable panel assembly, and more particularly relates to apparatus for controlling the operation of a slideable panel.

BACKGROUND OF THE INVENTION

Many vehicles employ a panel assembly having a moveable panel which is utilized to control access to an opening in the vehicle. One example of such an application is on the sliding back-windows currently available on many pick-up trucks. Unfortunately, current designs only allow latching of the moveable panel in its fully closed position. The moving panel is a free-motion state in all other positions. One drawback of this design is that the panel assembly represents a possible point of entry for theft when the moveable panel is not in its fully closed position. Accordingly, there exists a need to provide a panel assembly which provides better control over the movement of the moveable panel and a panel assembly.

BRIEF SUMMARY OF THE INVENTION

The present invention provides a panel assembly for a motor vehicle that provides the ability to securely control the size of an opening defined by the panel assembly. The panel assembly thus provides a theft deterrent by making it more difficult to get through a partially open window. Generally, the panel assembly comprises a fixed panel defining an opening, and a moveable panel for selectively covering the opening. A rail is attached to the fixed panel, and generally comprises a three-sided channel which slideably receives the moveable panel. The three sided channel has an attachment side attached to the fixed panel and an engagement side facing outwardly from the fixed panel. A handle is attached to the moveable panel and is spaced therefrom to define a recess sized to receive the engagement side of the rail. A cam is moveably mounted to the handle and defines an engagement surface which extends through a slot defined in the handle. The cam is biased against the engagement side and is operable between a locked position and an unlocked position. In the locked position, the engagement surface engages the engagement side, and the unlocked position the engagement surface is positioned away from the engagement side.

According to more detailed aspects, the handle and cam are capable of being operated with one hand and thus define a single hand actuator. The cam may be pivotally mounted to the handle, or alternatively may be axially slideable relative to the handle. When pivotally mounted, the proximal end of the cam is pivotally mounted while the distal end preferably defines the engagement surface. The distal end may be curved and extend outwardly away from the rail to facilitate operation of the cam. Alternatively, the proximal end of the cam may define the engagement surface, wherein the proximal end is eccentrically shaped to engage and disengage the rail upon rotation of the cam. The opposing sides of the handle preferably include flanges extending away from the rail a distance greater than the distance the handle projects away from the rail in the locked position, thereby preventing inadvertent actuation of the cam.

The engagement surface may be a planar surface, or alternately may include a plurality of gripping teeth or other engagement features. The cam may include a pin projecting towards the rail to define the engagement surface. With a pin, the engagement side of the rail defines a plurality of apertures sized to receive the pin for locking the moveable panel at a plurality of discrete positions. Accordingly, the assembly of the present invention allows securing the moveable panel at either an infinite number of latching locations or a discrete number of predetermined locations along the sliding path of the rail.

When the cam is axially adjustable in a direction normal to the rail, the cam is preferably biased towards the rail. Alternatively, the cam may be biased away from the rail and a latch is provided which fixes the cam in the locked position. The cam may thus be a push button sized to be operated with a single finger.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is plan view of the handle forming a portion of the panel assembly depicted in FIG. 1;

FIG. 4 is a cross-sectional view of the handle taken about line 4—4 in FIG. 2;

FIG. 6 is a cross-sectional view taken about the line 6—6 of FIG. 5.

DETAILED DESCRIPTION OF THE INVENTION

Figure 1:
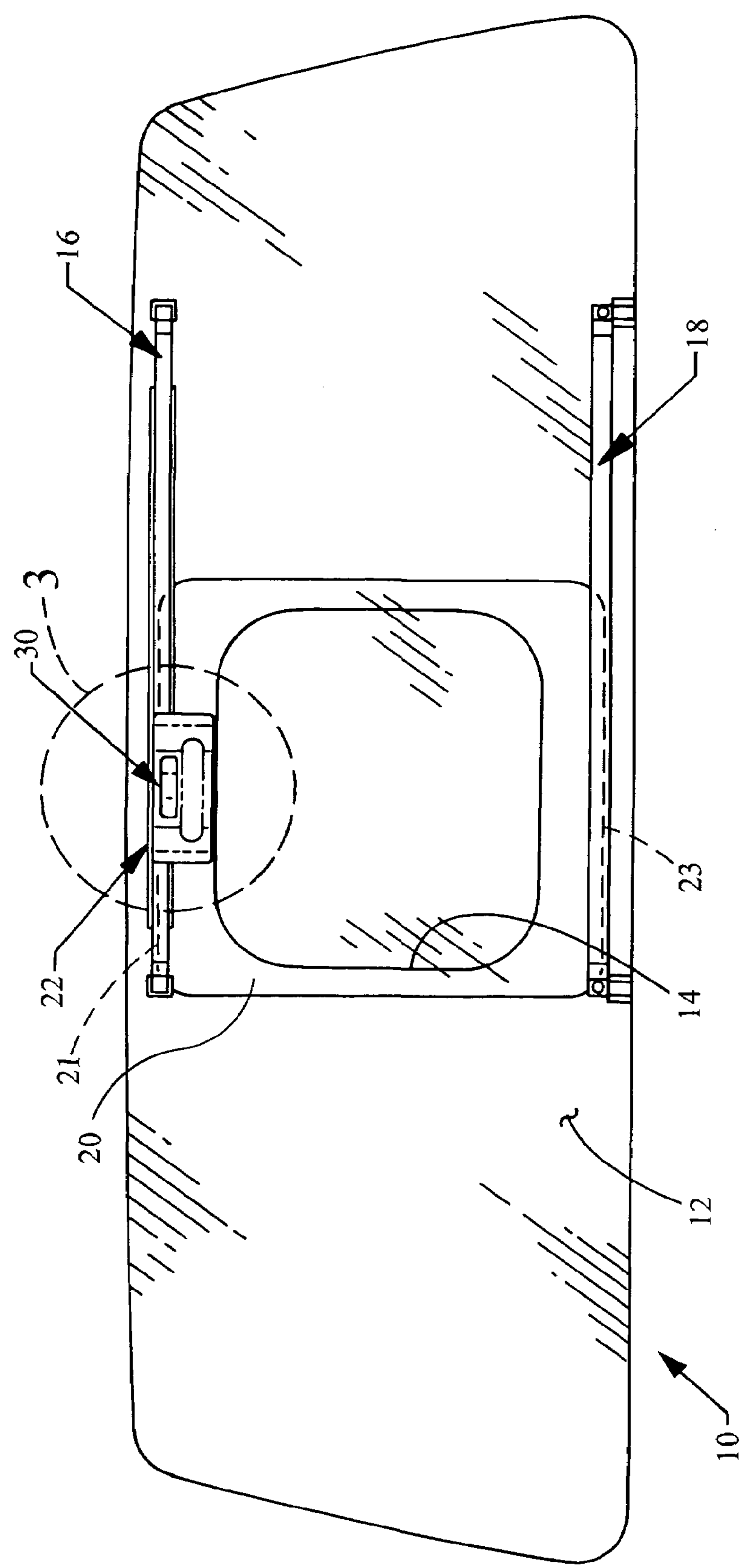
FIG. 1 is a plan view of an embodiment of the panel assembly constructed in accordance with the teachings of the present invention.

Turning now to the figures, FIG. 1 depicts a panel assembly 10 constructed in accordance with the present invention. The panel assembly 10 generally includes a fixed panel 12 which defines an opening 14. The fixed panel 12 may comprise an relatively rigid material, and preferably comprises a transparent material such as glass. The panel assembly 10 is preferably located in the passenger compartment of a vehicle, such as a passenger truck (not shown). The opening 14 thus provides access to the interior/exterior of the passenger compartment.

A pair of rails 16, 18 are attached to the fixed panel 12 and serve as a guide for moveable panel 20. The upper and lower ends 21, 23 of the moveable panel 20 are retained within the rails 16, 18 and allow the panel 20 to slide axially between a closed position (shown in FIG. 1) substantially covering or aligning with the opening 14, and an open position wherein at least a portion of the opening 14 is exposed. A handle 22 is connected to the moveable panel 20 which includes a cam 30 for allowing a user to slide the moveable panel 20 to a infinite or discrete number of locations along the slide path and latching the panel 20 in that position.

Figure 2:
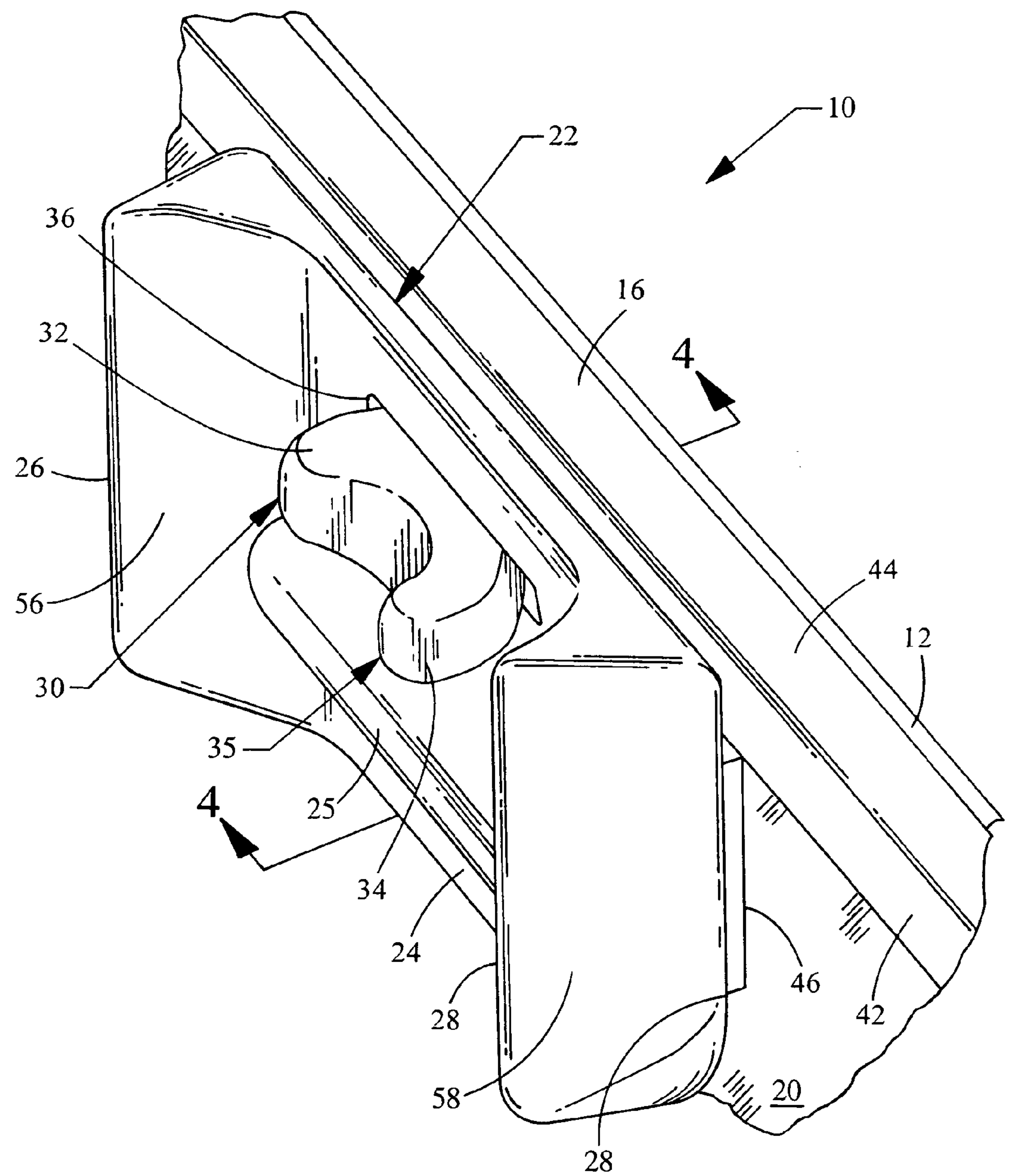
FIG. 2 is an enlarged perspective view, partially cut away, of the panel assembly depicted in FIG. 1.

Turning now to FIG. 2, an enlarged view of the panel assembly 10, partially cut away, has been depicted. The handle 22 of the assembly 10 has been shown in greater detail, and generally includes a planar body 24 attached to the moveable panel 20. The body 24 includes a left side edge 26 and a right side edge 28 which each define a flange 56, 58 projecting transversely from the rail 16. The handle 22 includes a cam 30, to be discussed in more detail herein, which is utilized to fix the position of the handle 22 relative to the rail 16, and hence fix the position of panel 20. Notably, the left and right flanges 56, 58 project away from the rail 16 a distance greater than the cam 30 projects away from the rail 16 (in its locked position). In this way, the flanges 26, 28 prevent unwanted actuation of the cam 30 by shielding it from the sides.

The main body 24 of the handle 22 also includes a boss 25 which supports the cam 30. The body 24 defines a slot 36 which is sized to receive the cam 30. The cam 30 extends through the slot 36 and engages the rails 16, as will be described below. The cam 30 generally includes a first proximal end 32 that is pivotably attached to the handle 22, and more particularly the boss 25 formed on the body 24. The opposing distal end 34 of the cam 30 is arcuate in shape and curves to project outwardly from the rail 16 to define a gripping portion 35 that facilitates operation of the cam 30 The handle 22 and cam 30 are sized and positioned to define a single hand actuator that is capable of being operated with one hand.

The pivotal connection of the cam 30 to the handle 22 is best seen in the plan view of FIG. 3, which shows the cam 30 partially cut away. The boss 25 has a pin 29 set therein. A torsion spring 27 is fitted around at least a portion of the outer periphery of the pin 29 and engages the cam 30. The cam 30 includes a recess 31 which receives the pin 29. The torsion spring 27 resists the relative rotation of the cam 30 and handle 22 (and hence also relative to the pin 29 when fixed to the boss 25) to bias the cam 30 towards the rail 16 (i.e. in a direction into the page in FIG. 3).

It can therefore be seen that the cam 30 is pivotably mounted to the handle 22 and has a distal end 34 which is spring biased into the rail 16, as can best be seen in the cross-sectional view of FIG. 4. The rail 16 generally comprises a three sided channel having an attachment side 40 opposite an engagement side 42 which are connected by a linking side 44. The attachment side 40 is connected to the fixed panel 12. The rail 16 defines a recess 17 for receiving the moveable panel 20.

The moveable panel 20 is attached to the handle 22 by way of a spacer 46 to thereby define a recess 48 between the moveable panel 20 and the body 24 of handle 22. The recess 48 receives the engagement side 42 of the rail 16. As previously discussed, the handle 22 includes slot 36 which allows the cam 30 to extend therethrough and engage the rail 16. More specifically, the cam 30 and its distal end 34 define an engagement surface 38 which is biased into and presses against the engagement side 42 of rail 16.

Figure 7:
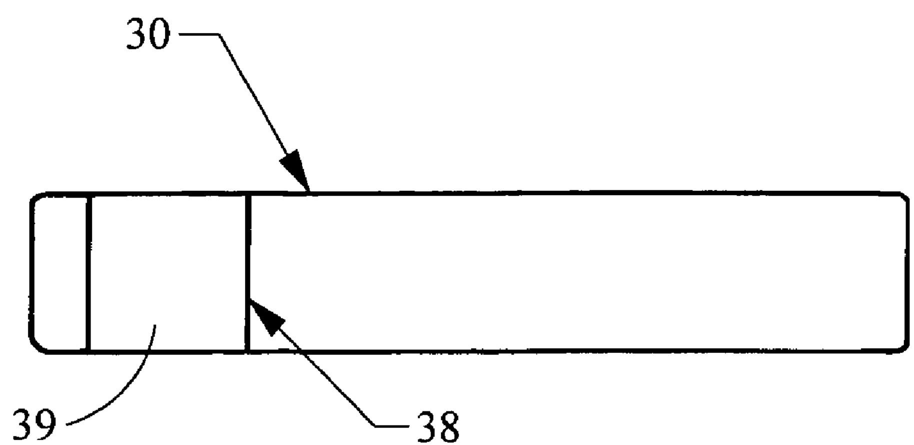
FIG. 7 is a plane view of the cam depicted in FIGS. 1–4.

The friction between the cam 30 and the rail 16 is sufficient to prevent movement of the moveable panel 20 by a person either inside or outside the vehicle. Alternatively, engagement surfaces may be employed such as teeth or tongues which cooperate with corresponding grooves, or simply gripping teeth (39, FIG. 7) formed on the engagement surface 38 of the cam 30 for creating a strong frictional bond with the rail 16. In this way, the moveable panel 20 and handle 22 may be latched to the fixed panel 12 via rail 16 at an infinite number of locations.

Accordingly, the cam 30 is operable between a locked position and an unlocked position. In the locked position, the cam 30, and more particularly its free end 34 are spring biased such that an engagement surface 38 engages the rail 16 for latching the moveable panel 20 at a desired location. In the unlocked position, the engagement surface 38 is positioned away from the rail 16, thereby allowing sliding movement of the moveable panel 20. The cam 30 is spring biased into the rail 16 so that the cam 30 is normally in its locked position.

Figure 5:
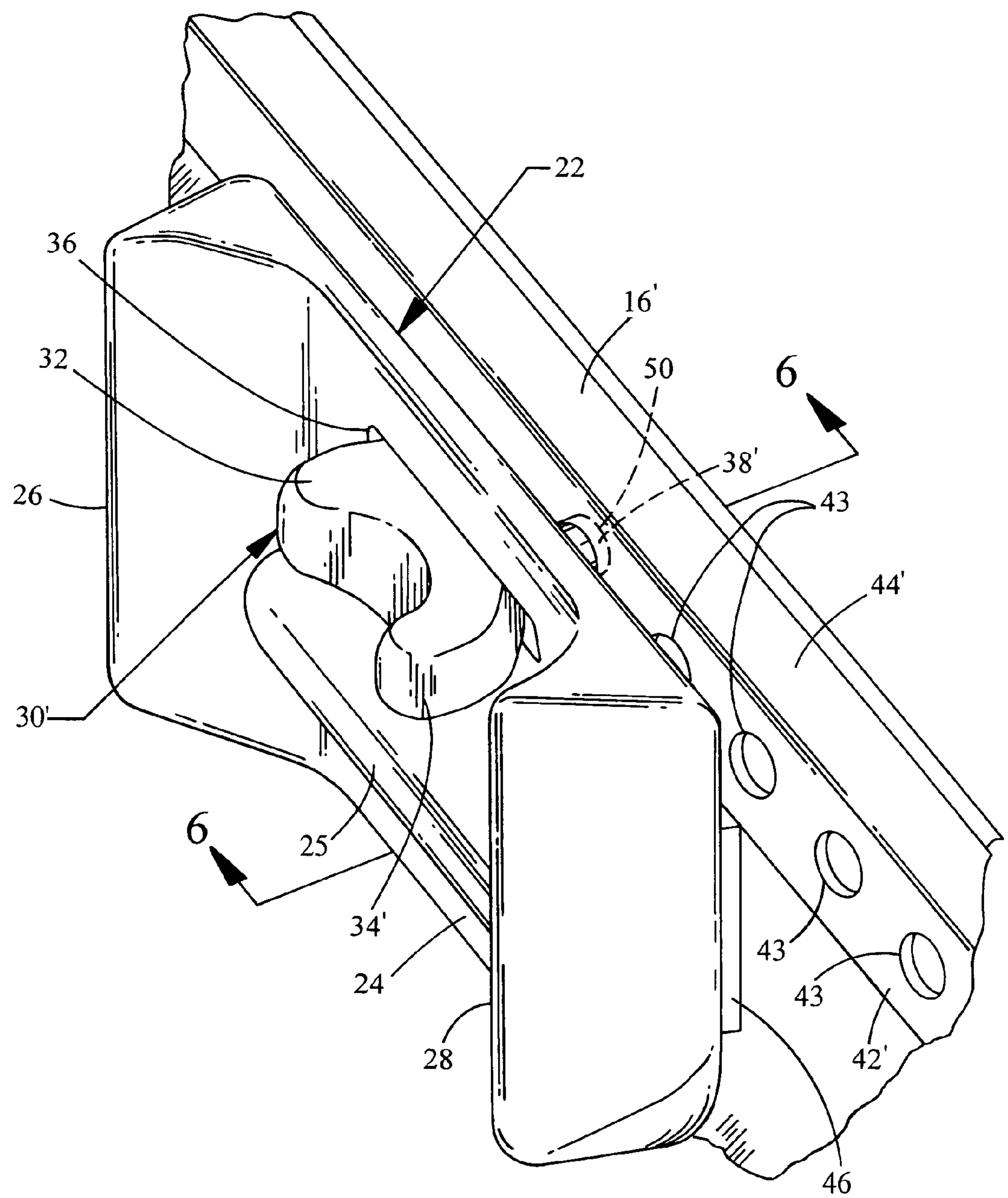
FIG. 5 is a perspective view similar to FIG. 2 but depicting an alternate embodiment of the handle.

An alternate embodiment of the panel assembly 10' has been depicted in FIGS. 5 and 6. The structure and operation of the panel assembly 10' is similar to that of the embodiment shown in FIGS. 2 and 4, but utilizes an alternative engagement surface 38' for engaging the rail 16'. Accordingly, like reference numerals have been utilized with like components of the embodiments.

More specifically, the cam 30' includes a distal end 34' having a projection or pin 50 projecting towards the rail 16'. The rail 16' includes an engagement side 42' having a plurality of apertures 52 formed therein. The apertures 52 are sized and positioned to receive the pin 50, which now defines the engagement surface 38'. The apertures 52 are spaced axially along the rail 16' such that the moveable panel 20 may be latched at discrete locations along the rail 16' by way of its handle 22 and cam 30'. The pin 50 extends into an aperture 52 and the outer periphery thereof defines the engagement surface 38' which engages the inner periphery of the aperture 52 in the locked position.

In another embodiment, and with reference to FIG. 2, the cam 30 may include a pivotally proximal end 32 which is eccentrically shaped such that in the locked position, the proximal end 32 engages the rail 16. As shown in the figure, the cam 30 would define a cam axis extending parallel to the rail 16. When the cam 30 is rotated such that its axis is non-parallel with the rail 16, the eccentric proximal end 32 would disengage the rail 16 allowing movement of the moveable panel 20. The distal end 34 would be used to operate the cam 30 between locked and unlocked positions.

In yet another embodiment, the cam 30 may be axially adjustable in a direction normal to the rail 16. In this embodiment, the cam 30 would be biased towards the rail preferably by a spring. Alternatively, the cam could be biased away from the rail 16, and a latch would fix the cam 30 in a locked position having the engagement surface 38 pressed against the engagement side 42 of the rail 16. The latch could thus be sized as a button to be pressed by a user with a single finger. Such push button, spring-loaded latches are well known in the art.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A panel assembly for a motor vehicle, the assembly comprising:

a fixed panel defining an opening;

a rail attached to the fixed panel, the rail comprising a three-sided channel having an attachment side wall attached to the fixed panel and an engagement side wall positioned outwardly from the fixed panel;

a movable panel slidably disposed within the rail for selectively covering the opening;

a handle attached to the moveable panel, the handle spaced from the moveable panel to define a recess between the handle and moveable panel receiving the engagement side wall of the rail channel;

a cam moveably mounted to the handle, the cam defining an engagement surface which extends through an aperture defined in the handle in communication with the recess to selectively engage the engagement side wall of the rail channel; and the cam being biased against the engagement side wall and operable between a locked position where the engagement surface engages the engagement side wall, and an unlocked position where the engagement surface is positioned away from the engagement side wall.

2. The assembly of claim 1, wherein the handle and cam define a single hand actuator capable of being operated with one hand.

3. The assembly of claim 1, wherein the cam is pivotally mounted to the handle and pivots about a pivot axis that is parallel to a plane defined by the moveable panel.

4. The assembly of claim 3, wherein the cam has proximal end pivotally mounted to the handle and a distal end opposite the proximal end.

5. The assembly of claim 4, wherein the distal end defines the engagement surface.

6. The assembly of claim 4, wherein the distal end is curved and extends outwardly away from the moveable panel to facilitate gripping operation of the cam.

7. The assembly of claim 4, wherein the proximal end defines the engagement surface, and wherein the proximal end is eccentrically shaped to engage and disengage the rail upon rotation of the cam.

8. The assembly of claim 1, wherein opposing sides of the handle include flanges extending away from the moveable panel a distance greater that the distance the handle projects away from the rail in the locked position.

9. The assembly of claim 1, wherein the engagement surface is a planar surface, and wherein the engagement side wall of the rail is flat.

10. The assembly of claim 1, wherein the engagement surface includes a plurality of gripping teeth.

11. The assembly of claim 1, wherein the cam includes a pin projecting towards the rail to define the engagement surface, and wherein the engagement side of the rail defines a plurality of apertures sized to receive the pin for locking the moveable panel at a plurality of discrete positions.

12. The assembly of claim 11, wherein the cam is biased towards the rail.

13. The assembly of claim 1, wherein the cam is moveable in a direction transverse to a plane of the moveable panel.

14. The assembly of claim 13, wherein the cam is a push button sized to be operated with a single finger.

15. The assembly of claim 1, further comprising a second rail comprising a three-sided channel, the moveable panel slidably disposed in both the first and second rails.

16. The assembly of claim 1, wherein the cam defines a cam axis, and wherein the cam axis is generally parallel with the rail when in the locked position.

* * * * *